United States Patent
Schuler et al.

(10) Patent No.: US 10,259,418 B2
(45) Date of Patent: Apr. 16, 2019

(54) KNEE PROTECTION APPARATUS IN A MOTOR VEHICLE AND KNEE AIR BAG MODULE FOR USE IN SUCH A KNEE PROTECTION APPARATUS

(71) Applicant: Autoliv Development AB, Vårgårda (SE)

(72) Inventors: Harald Schuler, Niederroth (DE); Oliver Adolph, Hebertshausen (DE)

(73) Assignee: Autoliv Development AB, Vårgårda (SE)

( * ) Notice: Subject to any disclaimer, the term of this patent is extended or adjusted under 35 U.S.C. 154(b) by 31 days.

(21) Appl. No.: 15/319,520

(22) PCT Filed: Jul. 2, 2015

(86) PCT No.: PCT/EP2015/065077
§ 371 (c)(1),
(2) Date: Mar. 28, 2017

(87) PCT Pub. No.: WO2016/005260
PCT Pub. Date: Jan. 14, 2016

(65) Prior Publication Data
US 2017/0210328 A1     Jul. 27, 2017

(30) Foreign Application Priority Data
Jul. 10, 2014   (DE) .................. 10 2014 010 188

(51) Int. Cl.
*B60R 21/206*    (2011.01)
*B60R 21/2338*   (2011.01)
*B60R 21/231*    (2011.01)

(52) U.S. Cl.
CPC ........ *B60R 21/206* (2013.01); *B60R 21/2338* (2013.01); *B60R 2021/23169* (2013.01)

(58) Field of Classification Search
CPC .............. B60R 21/206; B60R 21/2338; B60R 2021/23169
See application file for complete search history.

(56) References Cited

U.S. PATENT DOCUMENTS

| | | | |
|---|---|---|---|
| 6,752,417 B2 * | 6/2004 | Takimoto | B60R 21/206 280/730.1 |
| 7,090,245 B2 * | 8/2006 | Yoshikawa | B60R 21/206 280/729 |

(Continued)

FOREIGN PATENT DOCUMENTS

| | | |
|---|---|---|
| DE | 10 2010 026 932 A1 | 1/2012 |
| EP | 1 844 992 A2 | 10/2007 |

(Continued)

OTHER PUBLICATIONS

German Examination Report—dated Oct. 3, 2015.
PCT International Search Report—dated Nov. 4, 2015.

*Primary Examiner* — James A English
(74) *Attorney, Agent, or Firm* — Brinks Gilson & Lione

(57) ABSTRACT

A knee air bag apparatus having a housing (10) disposed in or adjoining a lower region of an instrument panel (I) extending from front to rear having an outlet opening (16). An inflator and a knee air bag (30) are mounted in the housing (10) in the initial state, and in an expanded state deploys in front of the instrument panel (I). The air bag outer skin has a protective section (32) and a fill and support section (36). The protective section (32) when expanded state is positioned, in front of the instrument panel (I). To improve deployment behavior, the fill and support section (36) features a vehicle-front section (38) such that with the knee air bag (30) fully expanded, the front section extends beyond the vehicle front end of the housing (10) in the direction of the vehicle front (FIG. 1).

7 Claims, 3 Drawing Sheets

(56) References Cited

U.S. PATENT DOCUMENTS

| | | | | |
|---|---|---|---|---|
| 7,819,420 B2* | 10/2010 | Adachi | ................ | B60R 21/203 280/730.1 |
| 2002/0171231 A1* | 11/2002 | Takimoto | .............. | B60R 21/206 280/730.1 |
| 2007/0126212 A1 | 6/2007 | Takimoto et al. | | |
| 2009/0134611 A1* | 5/2009 | Wigger | ................ | B60R 21/231 280/730.1 |
| 2011/0260434 A1* | 10/2011 | Gottschalk | ............ | B60R 21/206 280/730.2 |
| 2013/0113190 A1* | 5/2013 | Schneider | ............. | B60R 21/206 280/728.2 |

FOREIGN PATENT DOCUMENTS

| | | |
|---|---|---|
| EP | 2 376 313 B1 | 9/2012 |
| WO | WO 2011/056810 A1 | 5/2011 |
| WO | WO 2013/070524 A1 | 5/2013 |

\* cited by examiner

KNEE PROTECTION APPARATUS IN A MOTOR VEHICLE AND KNEE AIR BAG MODULE FOR USE IN SUCH A KNEE PROTECTION APPARATUS

CROSS REFERENCE TO RELATED APPLICATIONS

This application claims priority to German Patent Application No. 10 2014 010 188.6, filed on Jul. 10, 2014 and PCT/EP2015/065077, filed on Jul. 2, 2015.

FIELD OF THE INVENTION

The invention relates to a knee protection apparatus for a motor vehicle, and to a knee air bag module for use in one such knee protection apparatus.

BACKGROUND

Knee air bag modules play an increasingly important role in vehicle safety engineering. A knee air bag module of this kind features a housing, an inflator and a knee air bag pleated into the housing, the bag can be inflated by the inflator (usually in the form of a gas generator). Like all typical air bags, the knee air bag features an outer skin which encloses a gas space. Frequently the air bag also features internal catch bands (or tethers) in order to restrict the depth of the expanded, outer skin. In this case, in the inflated state, at least one section of the outer skin of the knee air bag is positioned between one section of the instrument panel and the knee-shinbone region of the passenger to be protected. The purpose of the knee air bag during the vehicle impact is, firstly, to prevent contact between the instrument panel and the sensitive knee-shinbone region of the passenger to be protected, and secondly, to counteract a forward displacement of the pelvis of the passenger, which is of great importance, especially for non-belted passengers.

The housing of the knee air bag module can be disposed in the instrument panel so that its outlet opening is located essentially opposite to the region to be protected, so that the air bag upon actuation of the inflator moves essentially directly upon the knee-shinbone region of the passenger to be protected.

In addition, the "low mount" knee air bag modules are becoming increasingly important, in which the housing of the knee air bag module is arranged in a lower region of the instrument panel or in a transition region between instrument panel and the foot space covering. In this case the outlet opening of the housing does face the knee-shinbone region of the passenger to be protected. Frequently the outlet opening is located essentially in the horizontal plane, and thus essentially faces downward in the direction of the bottom of the vehicle. From this it follows that the knee air bag upon ignition of the inflator is initially ejected essentially downward and only thereafter is deployed slanting upward, so that upon complete deployment of the knee air bag, a protective section of the outer skin of the knee air bag is positioned between a section of the instrument panel and the knee-shinbone region of the passenger. From this it also follows that the outer skin of the knee air bag in its fully expanded state must exhibit a curved or kinked cross section. Further, it also follows that besides the protective section, the outer skin also features a fill and support section connecting the protective section with the housing, which generally does not come into contact with a body part of the passenger.

For example, from EP 2 376 313 B1, or WO 2013 070 524 A1 or EP 2 496 446 A1, generic knee protective apparatuses are known in which the fully expanded, outer skin of the knee air bag features an essentially L-shaped cross section. In this case the longer leg of the L forms essentially the protective section, and the shorter leg of the L, which extends, for example, essentially horizontally, forms the fill and support section.

In this kind of "low mount" knee air bag modules, at least in many vehicle geometries, there can be a risk of tipping of the knee air bag downward, and/or of an insufficient deployment along the instrument panel unless appropriate countermeasures are taken. This applies in particular when the knee air bag attachment occurs exclusively by means of the bolts of the gas generator. The known countermeasures can be, for example, the provision of external bands, guides and additional 3D-structures. However, these are generally expensive and markedly increase the required installation space requirement for the knee airbag assembly.

Proceeding from the above, the problem of the present invention is to improve a knee protection apparatus such that with simple means, a more stable and more reproducible deployment behavior of the knee air bag is attained.

This problem is solved by a knee protection apparatus and knee airbag module in accordance with the present invention.

SUMMARY AND INTRODUCTORY DESCRIPTION

According to the invention, the fill and support section is lengthened in the direction of the vehicle front such that it features a vehicle-front section such that with the knee air bag fully expanded, the front section extends beyond the vehicle front end of the housing in the direction of the vehicle front.

This produces an enlarged volume of the portion of the gas space enclosed by the fill and support section, and in particular, a contact surface can be formed which is located on the far side of the housing, when viewed from the direction of the protected section. Thus any tipping of the knee air bag can be reliably prevented, even when the knee air bag is connected to the housing exclusively via the inflator mounting bolts. In addition, it is possible to design the outer casing of the knee air bag as a pure "2D" structure, which features exclusively two layers which are connected together along their mutual edges. Thus it will be possible to produce the outer skin of the knee air bag using only one or two tailored cuts (or fabric blanks). Accordingly, the knee air bag can be manufactured in a simpler and lower-cost manner, and requires a very small install volume.

The preferred application of the invention, as was already mentioned, is in the field of "low mount" knee air bag modules, in which the outer skin of the fully expanded knee air bag has an essentially L-shaped cross section, and the two legs enclose an essentially flat angle.

In particular, with the L-shaped knee air bag as mentioned above, it is generally preferable that the protective section encloses a protective chamber, and that the fill and support section encloses a fill and support chamber, wherein the protective chamber and the fill and support chamber are separated from each other by a separating element, in particular by a catch band, but are connected together by means of a flow connection. This results in a good formation of the desired, outer shape of the knee air bag.

The improved bracing of the knee air bag by the vehicle front section of the fill and support section, which acts not only in the vehicle longitudinal direction, but also in the vehicle transverse direction, is generally also sufficient when the vehicle front section of the fill and support section has a smaller width than the maximum width of the knee air bag. Thus it is possible, in particular, that the maximum width of the knee air bag is greater than the width of the housing, whereas the vehicle front section of the fill and support section has at most the width of the housing, so that it will fit into the housing, without transverse pleating, which is positive for its fast and reproducible deployment.

It is particularly preferred that the vehicle front section of the fill and support section be deployed and positioned at a very early point in time. This can be achieved, in particular, in that the protective section and a rear portion of the fill and support section form a packet rolled into and/or pleated into the housing in the initial state and that the vehicle front section of the fill and support section is positioned between the packet and the outlet opening of the housing. Due to the early positioning of the vehicle front section, it forms an abutment for the deployment of the remaining, outer skin of the air bag, which gives the "primary deployment" a great amount of stability.

Due to this improvement according to the invention, the advantage attained is that an exclusive attachment of the air bag to the vehicle is possible via the mounting bolt of an inflator accommodated in the air bag.

BRIEF DESCRIPTION OF THE DRAWINGS

The invention will now be described in greater detail based on exemplary embodiments with reference to the figures.

DETAILED DESCRIPTION

The first exemplary embodiment of the invention will now be described with respect to FIGS. 1 to 4.

Figure 1:
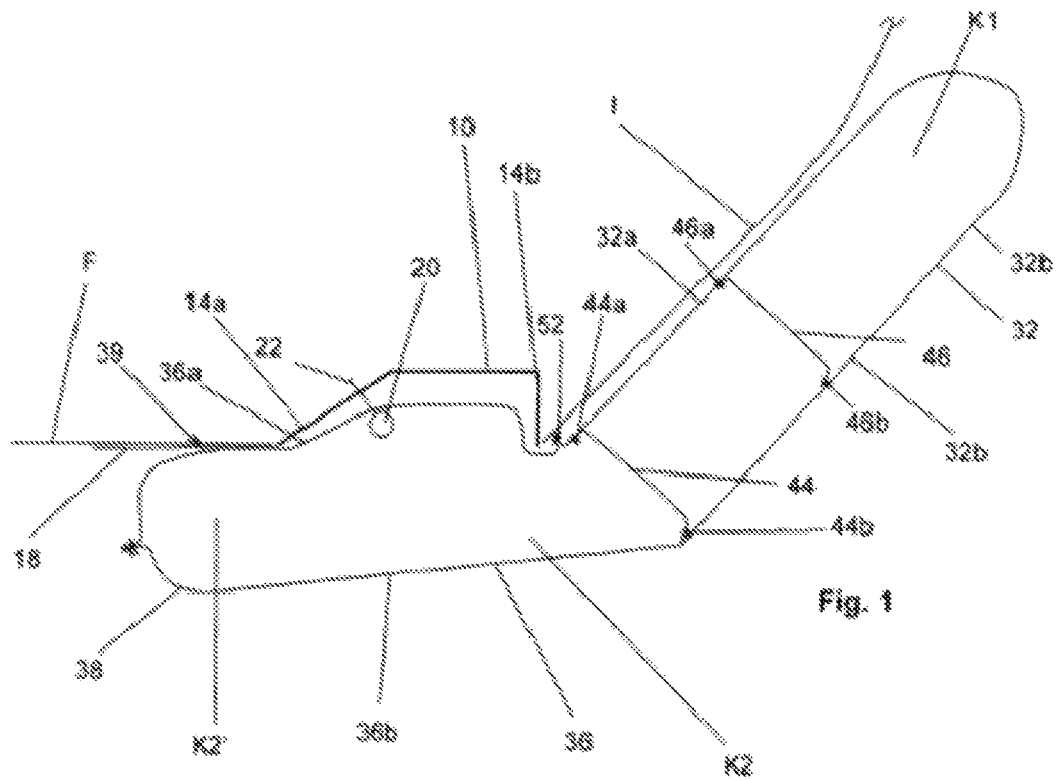
FIG. 1 shows a schematic cross section through a lower region of front dash panel, a foot space cover adjoining thereon, and a knee air bag module whose knee air bag is in its fully deployed state.

FIG. 1 depicts a lower region of an instrument panel I, a housing 10 adjoining thereon and extending in the direction of the vehicle front, and a foot space trim cover F extending from the housing 10 in the direction of the vehicle front. When the terms "front" and "rear" are used hereinafter, they are understood to mean in relation to the vehicle longitudinal direction, and "front" means the direction to the front of the vehicle, and "rear" means the direction to the rear of the vehicle. Likewise, the terms "above" and "below" refer to the installed position situation in a motor vehicle.

The depicted knee protection apparatus relates to a "low mount" knee protection apparatus, in which the housing 10 of the air bag module is disposed in a lower region of the instrument panel, or as depicted, is disposed at the lower end of the instrument panel. The outlet opening 16 of the housing 10 faces downward, and in the depicted exemplary embodiment, rests precisely in the horizontal plane, but this is not compulsory. A slight tipping, for example, of up to 20 degrees with respect to the horizontal, would also be possible, so that then the outlet opening would face downward and somewhat to the rear. However, an orientation such that the outlet opening of the housing 10 rests essentially in the horizontal plane, is preferred.

Figure 4:
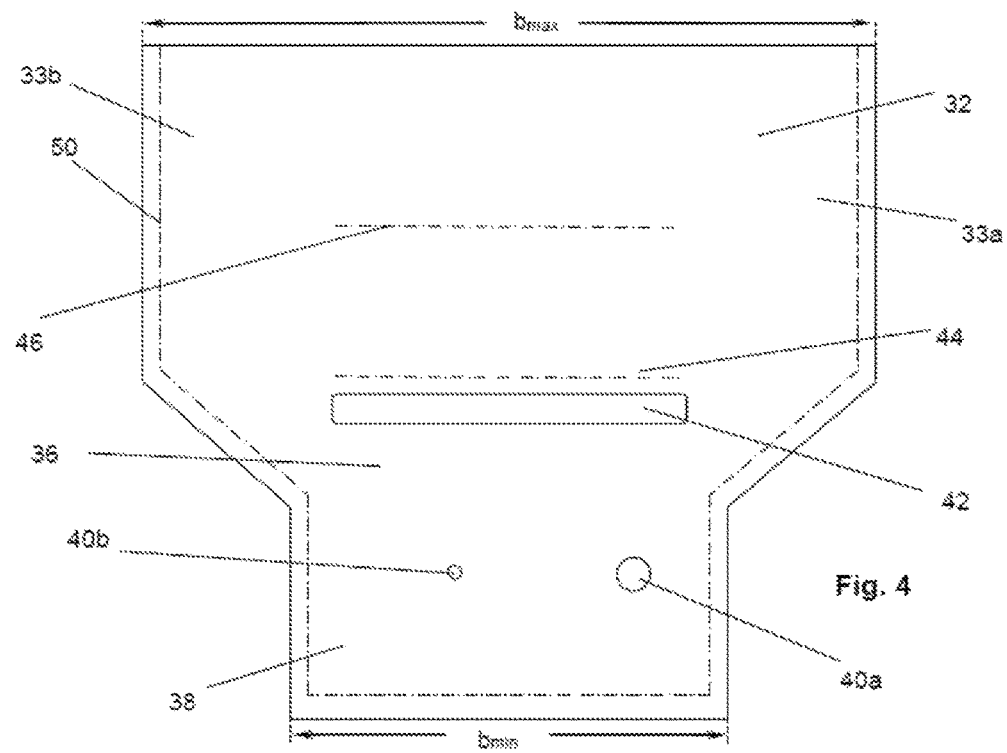
FIG. 4 shows the knee air bag of the knee air bag module from FIGS. 1 and 2, in an almost completely, deployed but not expanded state.

The housing 10 features a bottom or base 12 positioned opposite the outlet opening, and a side wall, wherein due to the cut-away presentation, only the front section of the side wall 14A and the rear section of the side wall 14B are shown. In the at-rest position, the outlet opening 16 is closed by a cover 18, which is partially detached by the expanding air bag from the housing or from an enclosing component. A gas generator 20 acting as inflator is disposed in the housing 10 and is connected to the housing via bolts 22 (usually two bolts which are shown schematically). The bolts 22 pierce the outer skin of the knee air bag, for which purpose the outer skin has the breaks (holes or apertures) 40a, 40b, is best shown in FIG. 4. In addition to filling of the air bag skin, the gas generator 20 with bolts 22 is also used for joining of the air bag to the housing 10. In addition, naturally the knee air bag module also features a knee air bag 10, which features, —in addition to the outer skin surrounding the gas space, catch bands or tethers (two such catch bands here), namely the front catch band 44 and the rear catch band 46. The outer skin forms the "actual" air bag. Within the meaning of the definition used herein, however, the air bag consists of the outer skin and the catch bands 44 and 46.

In the fully expanded state, as is depicted here in FIG. 1, the outer skin of the knee air bag 30 has an L-shaped cross section, and the two legs of this L are not positioned perpendicular to each other, but rather enclose a shallow angle, preferably between 100° and 150°, between them. In the depicted embodiment described, the knee air bag 30 is a so-called "2D" air bag, whose outer skin has just two layers, which are joined together at their edges. In the depicted, exemplary embodiment, the outer skin is pleated from a single, tailor-cut piece, so that a pleat edge (the rear edge) is produced. The remaining joint along the edge is created by means of a perimeter margin seam 50, which can be designed as an adhesion bond or weld seam. The first leg abutting the housing 10 forms the fill and support section 36 for the protective section 32 (second leg). Each of the named sections has a first layer 32a, 36a facing in a forward direction relative to the vehicle, and a second layer 32b, 36b facing away from the vehicle that is in a rearward direction relative to the vehicle. The second layer 32b of the protective section 32 hereby forms the impact surface adapted for contact with the vehicle occupant.

The L-shape is produced in that the first layer 32a features an elongated recess 42, which is sealed by means of a closure seam 52, as is known from EP 2 376 313 B1. FIG. 4 depicts the elongated recess in the state as yet not sealed by the closure seam 52. The front catch band 44 is joined to the first layer 32a (as shown by means of seam 44a) abutting this closure seam 52, or with the closure seam. This front catch band 44 extends through the gas space, is joined with the second layer 32b (as shown by means of seam 44b) and divides the gas space into a protective chamber K1 and a fill and support chamber K2. In this respect, the protective section of the outer skin essentially surrounds the protective chamber, and the support and fill section essentially surrounds the support and fill chamber.

In order to limit the thickness of the protective chamber K1, a rear catch band 46 is also provided.

According to the invention, the fully expanded support and fill section 36 extends past the vehicle front end (front side wall section 14a) of the housing 10 in the direction of the vehicle front. This section extending past the housing is designated as the vehicle front section 38 of the fill and support section. Thus the fill and support chamber K2 also has a front section K2', which is positioned in front of the housing (in the vehicle direction). In addition, the vehicle front section 38 features a support area 39 (which is a section of the first layer 36a of the fill and support section), which rests against a vehicle component (meaning the foot space cover here) in front of the housing 10 in the vehicle direction. Thus, due to the relatively large distance of the vehicle front end of the knee air bag to the bolts 22 of the gas generator 20, an abutment is created with a large lever for the protective section 32, so that the invented effect will occur.

Figure 2:
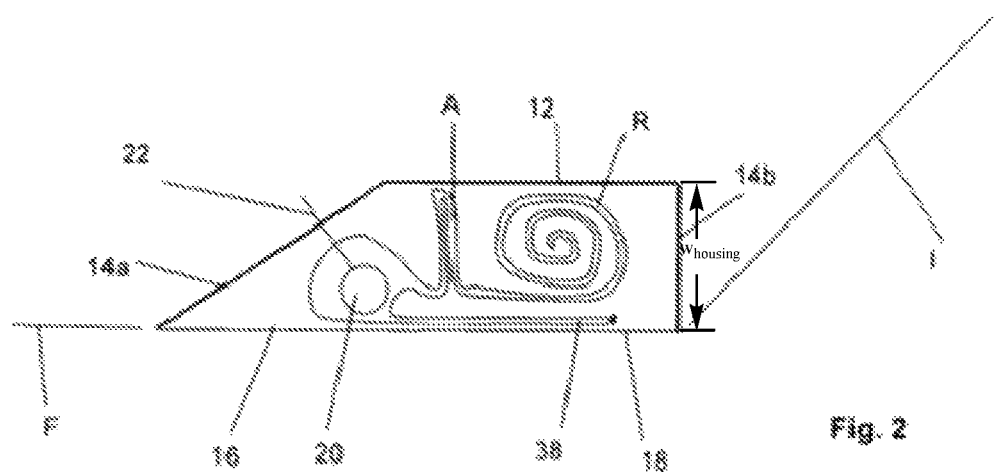
FIG. 2 shows the knee air bag module from FIG. 1, wherein the knee air bag is in its at-rest position.
Figure 3:
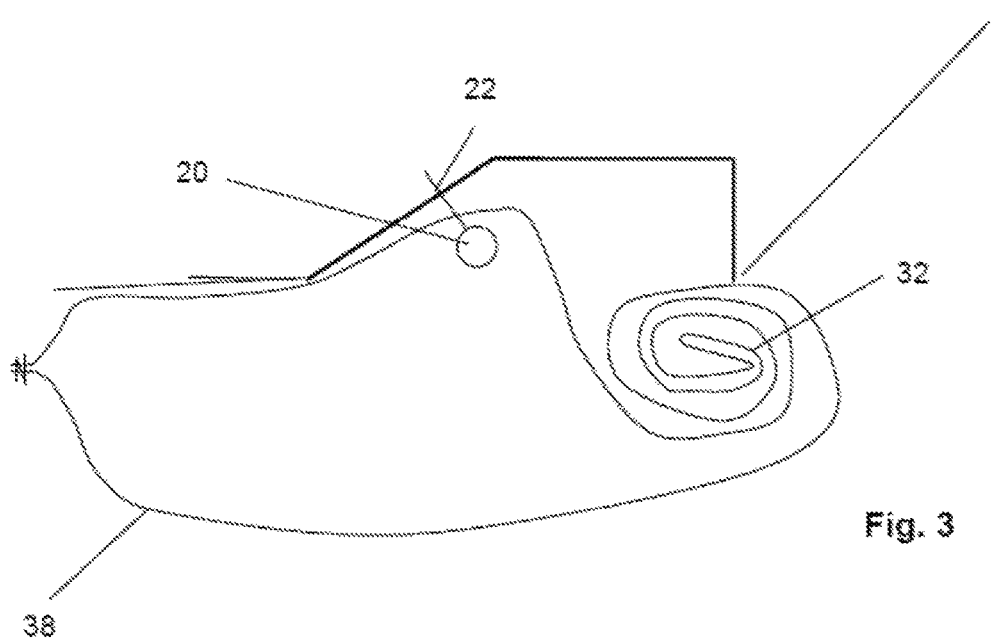
FIG. 3 shows a depiction from FIG. 2 at an early time of its expansion of the knee air bag.

FIG. 2 depicts one example of a preferred pleating of the knee air bag 30 in the housing 10. In this case the protective section 32 and the rear part of the fill and support section 36 are rolled and/or pleated into one packet; in the depicted embodiment, in the form of a roll R and an ejector pleat A. A portion of the fill and support section 36, namely that which includes the vehicle front section 38, is positioned between the packet and the outlet opening, as is shown in FIG. 2. This means that the vehicle front section expands at a very early point in time after ignition of the gas generator 20, and referring to FIG. 3 is positioned such that the protective section 32 finds a stable abutment upon its expansion.

As is depicted in FIG. 4, the width $b_{min}$ of the vehicle front section 38 can be smaller than the maximum width $b_{max}$ of the protective section 32, wherein in this case the maximum width $b_{max}$ is greater than the width of the housing 10, shown in FIG. 2 as $W_{housing}$, so that before rolling up the protective section 32, side regions 33a, 33b must be pleated or folded inward. The width of the vehicle-front section 38 $b_{min}$ in this regard is preferably at a maximum as large as the interior width of the housing.

Figure 5:
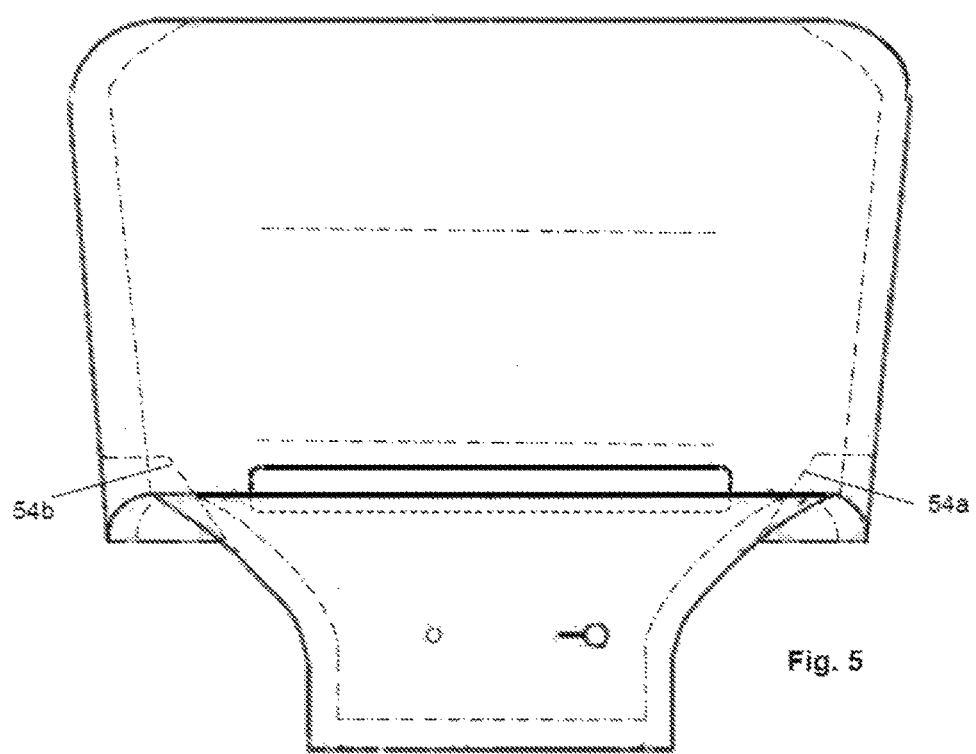
FIG. 5 shows a variation of the depiction of FIG. 4.

In order to improve the formation of the kink between the two legs of the knee air bag, as depicted in FIG. 5, the knee air bag can feature a transverse pleat in the transition zone between fill and support section and protective section, which is secured by means of connecting seams 54a, 54b.

While the above description constitutes the preferred embodiment of the present invention, it will be appreciated that the invention is susceptible to modification, variation and change without departing from the proper scope and fair meaning of the accompanying claims.

What is claimed is:

1. Knee protection apparatus for a motor vehicle having an instrument panel, the apparatus comprising:
   a housing disposed in a lower region of the instrument panel or in a region adjoining a lower end of the instrument panel, the housing extending from a vehicle front housing end to a vehicle rear housing end and having an outlet opening,
   an inflator, and
   a knee air bag having an outer skin, the knee airbag being received in the housing in an initial state, and in an expanded state being positioned in sections in front of the instrument panel,
   wherein the outer skin of the knee air bag forms a protective section and a fill and support section connecting the protective section to the housing,
   wherein the outer skin of the knee air bag in a fully expanded state forms a substantially L-shaped cross-section with a first leg and a second leg, in which the fill and support section forms the first leg and the protective section forms the second leg,
   wherein the protective section in the expanded state is positioned, at least in sections, in front of the instrument panel so that in a vehicle longitudinal direction, the protective section is located at least in sections behind the vehicle rear housing end, and
   wherein the fill and support section forms a vehicle front section such that with the knee air bag in the fully expanded state, said vehicle front section extends beyond the vehicle front housing end toward a vehicle front,
   wherein the protective section and a rear portion of the fill and support section in the initial state form a packet which is rolled or pleated into the housing, and the vehicle front section is positioned between the packet and the outlet opening of the housing and gas flows directly from the inflator to the vehicle front section and the packet respectively such that the vehicle front section deploys first and forms a counter bearing for the packet.

2. The knee protection apparatus according to claim 1, wherein the vehicle front section comprises a support surface which, when the air bag is in the fully expanded state, rests against a vehicle component outside of the housing and forms the counter bearing for the protective section.

3. The knee protection apparatus according to claim 1, wherein the two legs enclose an angle of between 100° and 150°, and wherein the second leg is longer than the first leg.

4. The knee protection apparatus according to claim 1, wherein the protective section encloses a protective chamber and wherein the fill and support section encloses a fill and support chamber, wherein the protective chamber and the fill and support chamber are separated from each other by a separating element, but are in a flow connection with each other, wherein the separating element is a tether.

5. The knee protection apparatus according to claim 1, wherein at least the vehicle front section of the fill and support section has a smaller width than a maximum width of the knee air bag, wherein the housing has a housing width greater than the width of the vehicle front section of the fill and support section, and the maximum width of the knee airbag is greater than the housing width.

6. The knee protection apparatus according to claim 1, wherein the outlet opening of the housing is located generally in a horizontal plane.

7. The knee protection apparatus according to claim 1, wherein at least two bolts extend from the inflator through the outer skin of the knee air bag and are connected to the housing, and that the connection of the knee air bag with the housing is exclusively formed via the at least two bolts.

\* \* \* \* \*